United States Patent [19]
DuBose et al.

[11] Patent Number: 5,442,648
[45] Date of Patent: Aug. 15, 1995

[54] NOISE REJECTION CIRCUITRY AND LASER SYSTEM USING THE SAME

[75] Inventors: Harold D. DuBose, Mountain View; Kevin K. Holsinger, Menlo Park, both of Calif.

[73] Assignee: Spectra Physics Lasers, Inc., Mountain View, Calif.

[21] Appl. No.: 277,343

[22] Filed: Jul. 19, 1994

[51] Int. Cl.⁶ ............................................. H01S 3/00
[52] U.S. Cl. .................................................. 372/38
[58] Field of Search ................................ 372/38, 33

[56] References Cited

U.S. PATENT DOCUMENTS

| | | |
|---|---|---|
| 4,314,211 | 2/1982 | Mollenaur . |
| 4,344,173 | 8/1982 | Straus . |
| 4,674,093 | 6/1987 | Angerstein et al. . |
| 4,779,279 | 10/1988 | Brown . |
| 4,792,956 | 12/1988 | Kamin . |
| 5,123,024 | 6/1992 | Dowd et al. ............ 372/38 |

*Primary Examiner*—Léon Scott, Jr.
*Attorney, Agent, or Firm*—Haynes & Davis

[57] ABSTRACT

A controller including a closed loop servo system for a laser, or other entity is capable of substantial reductions in predictable, periodic noise such as the line noise induced by the source of alternating current electrical power, and in random noise as well. The servo circuit includes resources which develop a stored version of the predictable noise and uses the stored version of the predictable noise to compensate for the predictable noise. According to another aspect, the servo circuit includes resources which automatically adjust loop gain as gain in the entity being controlled and the loop as a whole system varies. The resources which generate the stored version of the predictable noise may be operated in either analog or digital formats. The sampling resources include, in an analog/digital embodiment, a plurality of charge holding devices, Multiplexing circuitry is coupled to the charge holding devices, and connects a selected charge holding device to a sample node which receives the feedback signal. Control circuits control the multiplexing circuitry to switch, in sequence, the plurality of charge holding devices to the sampling node in synchronism with the predictable periodic noise so that a stored version is developed in the plurality of charge storage devices. In addition, the servo circuit includes resources which automatically adjust loop gain as the slope of the laser system varies, which substantially reduces both random and periodic noise.

28 Claims, 10 Drawing Sheets

NOISE CANCELLATION SYSTEM

FIG. 9

NOISE CANCELLATION SYSTEM

NOISE REJECTION CIRCUITRY AND LASER SYSTEM USING THE SAME

BACKGROUND OF THE INVENTION

1. Field of the Invention

The present invention relates to noise rejection based upon closed loop servo systems, such as those used to control the output power of ion lasers.

2. Description of Related Art

Many ion lasers employ a cathode that is heated by a source of alternating electrical power, such as commonly available through wall outlets. The fields caused in the cathode heated by this alternating current induce a noise on the output beam which is periodic and substantially repeatable and therefore predictable. The tube also produces other noise, most of which is random and unpredictable.

To reduce both kinds of noise in prior art systems, a closed loop servo has been utilized. However, it is often desirable to further reduce the noise, since the noise can interfere with the laser's intended use. Some uses are especially degraded by the presence of periodic noise.

Historically, companies have employed a light detector to detect the light output of the laser. The light output signal is typically fed into a closed loop servo control system which fluctuates the current through the ion laser tube in order to: (1) reach the desired power output level, and (2) reduce unwanted noise superimposed on the laser beam, especially the line related noise caused by the AC heating of the cathode. Throughout the laser industry, the line noise on the beam has been reduced to specified levels ranging from about 0.1% peak to peak, to about 1% peak to peak. However, many applications require greater reduction of noise on the output beam.

There is much work in the field of adaptive noise cancellation, for example, related to noise generated by automobiles, airplanes, and in factories near heavy machinery, and in the field of computer modems. One prior art system for handling predictable noise in servo systems is known as the least-mean-square algorithm, or LMS algorithm. See, Widrow, et al., *ADAPTIVE SIGNAL PROCESSING*, Prentice-Hall 1985, Ch. 6, pp. 99-101. For instance, the Widrow text describes one technique for cancelling line noise in electrocardiography (see p. 329, et seq.). However, this approach is based on the use of recursive adaptive filters, which are somewhat processing-intensive. Widrow, et al., Ch. 12, pp. 302-331 (see FIG. 12.1 on p. 304, in particular).

In the ion laser field, the ability of a typical laser servo loop is limited further because of the requirement of retrofitability of the laser head with different power supplies in the field. The head and power supply are usually separable from one another. The slope of the laser beam output (light output per amp of current through the tube) is directly reflected in the servo loop, and directly affects the gain/bandwidth of the servo loop for controlling the noise. This slope varies (most importantly) due to: (1) ordinary variability in manufacturing, (2) aging, (3) the power level used by the customer, and (4) optics. Servo loops for commercial laser systems are typically adjusted to work at maximum current with a laser having maximum slope to insure retrofitability. However, a customer may use the system at low power or may have a tube that has lower than optimal slope. The lower slope in the laser tube causes a lesser noise rejection capability in the servo loop. The gain/bandwidth of the resulting closed loop may be reduced by a factor of 10 or more as compared to what could occur if the servo loop were properly adjusted.

Accordingly, it is important to provide a laser system controller which is capable of reducing line frequency noise beyond current standards, and which optimizes performance of servo loops for a wide variety of commercial laser systems.

SUMMARY OF THE INVENTION

The present invention provides a controller including a closed loop servo system for a laser, or other entity to be controlled, which is capable of substantial reductions in predictable, periodic noise, such as the line noise induced by the source of alternating electrical power. In addition, the system is capable of automatically adjusting the gain of the loop as the slope in the laser beam varies with operating conditions.

Accordingly, the present invention can be characterized as a controller for a system generating an output subject to noise which includes a power driver coupled to the system which supplies power to the system, an output light signal monitor coupled to the system, and generating a feedback signal indicating a characteristic of the output of the system; and a servo circuit coupled to the output signal monitor and the power driver which controls the power driver to compensate for noise reflected in the feedback signal. The servo circuit includes resources according to the present invention which develop a stored version of the predictable noise and which use the stored version of the predictable noise to compensate for the predictable noise.

These resources which generate the stored version of the predictable noise may be controlled in either hard-wired circuitry or by a programmed processor. Also, the stored signal may be developed and stored in analog components, such as capacitors, or may be developed and stored digitally.

The sampling resources include, in one system, a plurality of charge holding devices, each having a first terminal coupled to a reference potential, and a second terminal. Multiplexing circuitry is coupled to the second terminals of the plurality of charge holding devices, and connects the second terminal of a selected charge holding device to an output of the multiplexing circuitry. The output of the multiplexing circuitry is coupled to a sample node which receives the feedback signal. Control circuits control the multiplexing circuitry to switch, in sequence, the plurality of charge holding devices to the sampling node in synchronism with the predictable periodic noise so that a stored version is developed in the plurality of charge storage devices. A loop summing junction is coupled to the sample node which injects voltage developed at the sample node into the error compensation component of the servo loop.

The control circuits coupled with the multiplexing circuitry are coupled with the source of alternating current, and include timing circuitry which generates a clock signal for controlling the multiplexing circuitry in response to the source of alternating current.

According to another aspect of the present invention, a system controlled by the servo loop is a laser, or more particularly an ion laser having a cathode which is heated by the source of alternating electrical current. The predictable periodic noise is induced in the output beam of the laser system through the heating of the cathode, or by some other mechanism.

According to one aspect of the present invention, the servo circuit also includes a relatively broad band loop compensation network tending to cause the error compensation component of the loop to cancel partially the relatively unpredictable noise in the output of the system and also the predictable periodic noise. The servo circuit includes resources which automatically adjust loop gain of the broad band servo circuit as the slope of the laser beam varies. This second aspect reduces both predictable and unpredictable noise. A system according to the present invention having the automatic gain control and the synchronous noise reduction added to the servo controller produces superior performance and manufacturability.

Although the invention can be accomplished in either analog or digital components, or a combination of the two, a simple analog/digital embodiment, which is relatively inexpensive and reliable, can be achieved. The system does not require a complicated computer system in order to further reduce the predictable noise in a control system.

Other aspects and advantages of the present invention can be seen upon review of the figures, the detailed description, and the claims which follow.

DETAILED DESCRIPTION

Figure 1:
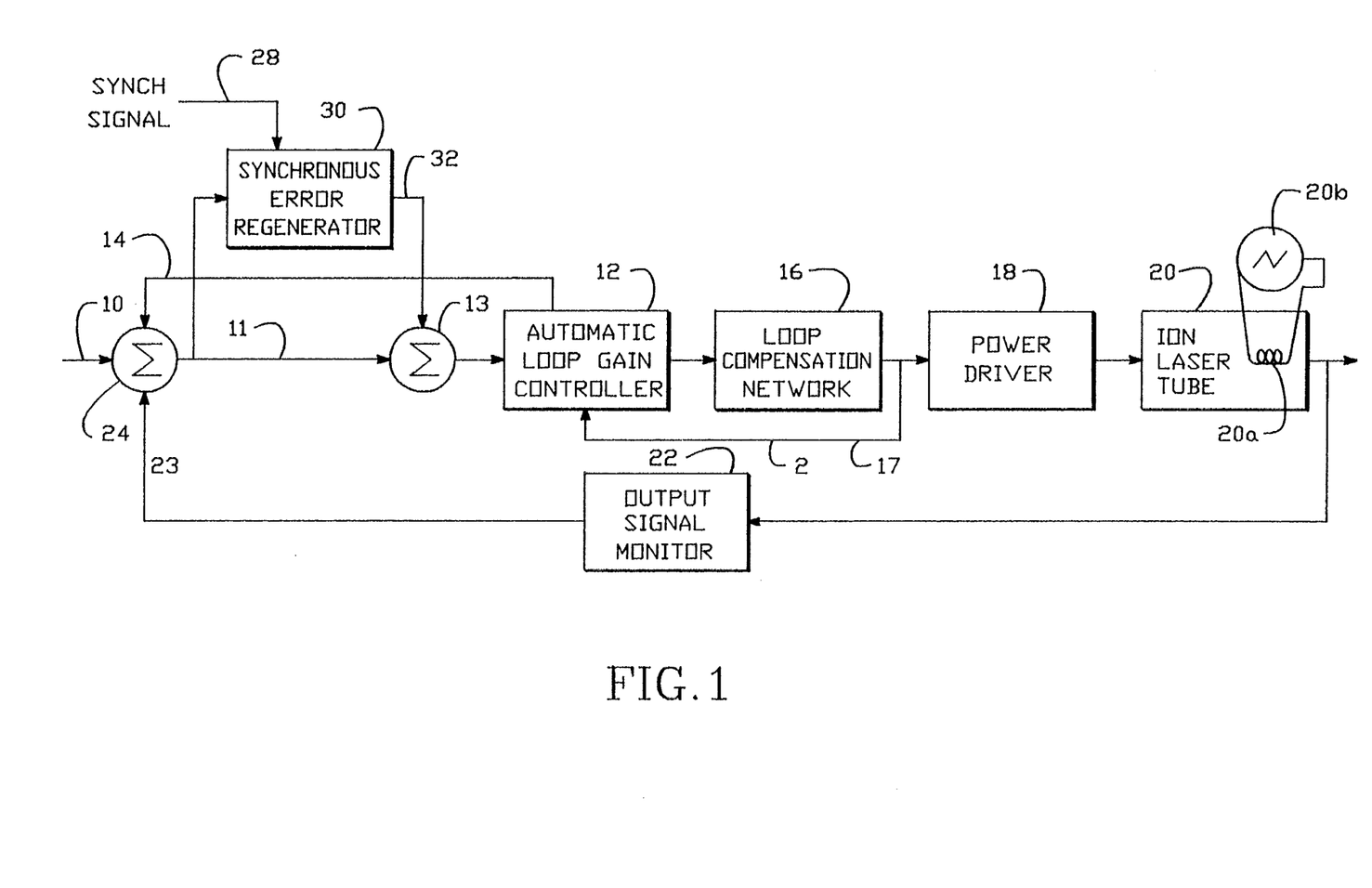
FIG. 1 is a schematic block diagram of a laser power supply servo according to the present invention.

A detailed description of preferred embodiments of the present invention is provided with reference to the figures, in which FIG. 1 provides an overview block diagram of a servo controlled laser system according to the present invention. In FIG. 1, the entity to be controlled is an ion laser tube 20, having a cathode 20a which is heated by the power line AC current source 20b. Thus, a 50 Hz or 60 Hz noise is induced in the output of the ion laser. The present invention is also applicable to other entities which can be controlled, and suffer a predictable, periodic noise.

The servo loop shown in FIG. 1 is connected to control a power driver 18 for the ion laser tube 20. The power driver 18 supplies current to induce plasma in the laser tube which in turn produces a laser beam. The output of the laser tube 20 is monitored using standard power monitoring techniques known in the art in an output signal monitor, schematically illustrated as 22. The output of the output signal monitor 22 is a signal on line 23 which is fed back through a summing junction 24. The other inputs to the summing junction 24 include a control command on line 10 which is used to set the desired output power of the laser tube 20. Also, a signal on line 14 from an automatic loop gain controller 12 is supplied as input to the summing junction 24. The output of the summing junction 24 is an error signal on line 11. This error signal is supplied to a synchronous error regenerator 30 and to summing junction 13. Synchronous error regenerator 30 develops a stored version of the synchronous error, in this case the 50 Hz or 60 Hz line noise, and supplies that stored version to the summing junction 13 across line 32. The synchronous error regenerator 30 develops the stored version in response to a synch signal 28 which is supplied in synchronism with the predictable, periodic noise.

The output of the summing junction 13 is supplied to the automatic loop gain controller 12. The automatic loop gain controller 12 controls the gain of the loop automatically, in order to make sure that the loop is adjusted for optimum performance of the ion laser tube 20.

The automatic loop gain controller 12 operates by injecting a low frequency signal (approximately 12 Hz) across line 14 to the summing junction 24. The gain of the loop is determined by measuring the magnitude of the resultant low frequency signal on line 17. The resultant low frequency signal on line 17 is detected by narrow band filter-detector circuitry, and fed to a multiplying means to allow the overall loop gain to be adjusted. Loop gain can thus be precisely controlled. Thus, the overall loop gain can be controlled to compensate for variations in the slope of the ion laser beam 20, or other components of the servo loop. The signal on line 14 is typically a low frequency, low magnitude signal which has negligible impact on the output of the entity being controlled. However, because of the narrow band (typical bandwidth is 0.1 Hz) detection of the injected noise, it can be utilized to control overall loop gain.

The output of the automatic loop gain controller 12 is supplied to a loop compensation network 16 which provides a fixed, relatively broad band error compensation for the loop. The output of the loop compensation network 16 is supplied to the power driver 18, and controls the power supplied to the ion laser tube 20 in response to the command in line 10 and an error compensation component generated in the loop. The synchronous error regenerator 30 supplies a component to the error signal which compensates for the very narrow band predictable periodic noise in the loop. This, in combination with the loop compensation network 16, provides a combination of relatively broad band compensation, and narrow band compensation for controlling the power driver. Thus, in response to the feedback signal on line 23, the error compensation component is developed using the synchronous error regenerator 30, and the loop compensation network 16.

The operation of the automatic loop gain controller 12 can be understood with reference to the following explanation of the servo loop. In particular, the loop can be represented by equation 1, as follows:

$$\frac{V_c * X * K1 * K2}{(\Delta I/\Delta V) * K3(\Delta P/\Delta I) * K4(\Delta V_{FB}/\Delta P)} = A \quad \text{(Eq. 1)}$$

where:

$V_c$ is the input voltage on line 10 setting the power for the laser,

X is the gain provided by the automatic loop gain controller 12.

K1 is a constant gain in the loop gain compensation network 16.

K2 is a constant, $\Delta I$ is equal to the change in current at the output of power driver 18, ΔV is the change in voltage on the input of power driver 18,
K3 is a constant,
ΔP is a constant AC noise injection generated by the automatic loop gain controller on line 14,
K4 is a constant, and
ΔV$_{FB}$ is the change in feedback voltage on line 23.

The purposes of understanding the automatic loop gain controller, K1, K2(ΔI/ΔV) and K4(ΔV$_{FB}$/ΔP) are constants. Thus, solving the equation 1 for the parameter X yields equation 2, as follows:

$$X*K3(\Delta P/\Delta I)=K5, \text{ or } X=K6(\Delta I/\Delta P) \quad \text{(Eq. 2)}$$

Because the circuitry injects ΔP at a constant level, the gain X of the automatic loop gain controller can be expressed as set out in equation 3, as follows:

$$X=K7*\Delta I \quad \text{(Eq. 3)}$$

Therefore, block 12 multiplies the input voltage on line 13 by K7 times ΔI, maintaining the loop gain constant. This provides automatic gain control for the loop, compensating for variations in the slope of the ion laser tube.

Figure 2:
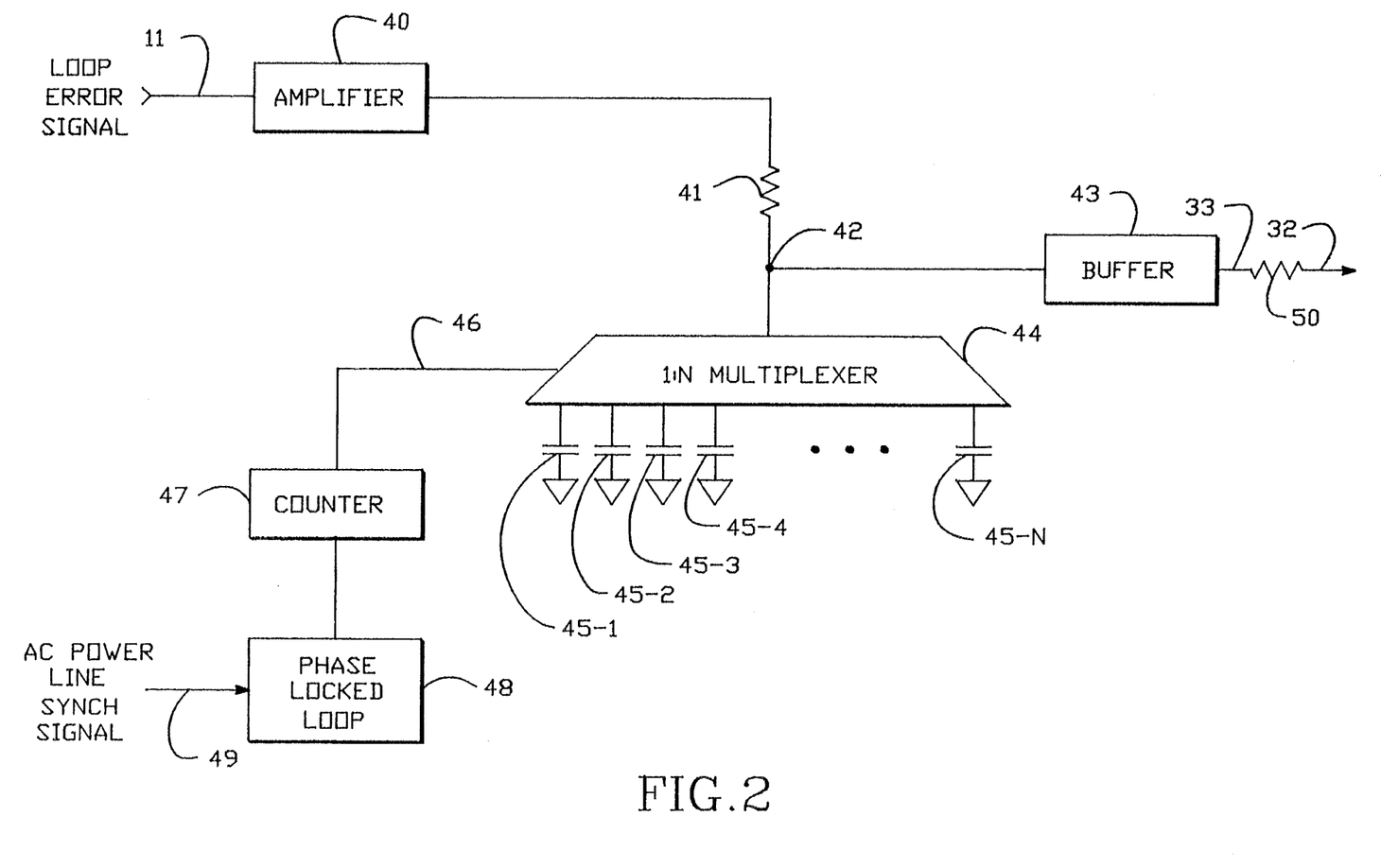
FIG. 2 is a simplified block diagram of the synchronous error regenerator used with the servo system of FIG. 1.

FIG. 2 provides a simplified schematic diagram of the synchronous error regenerator 30 for the system of FIG. 1. The circuit receives the loop error signal from line 11 and generates a synchronous error signal on line 33. The loop error signal on line 11 is supplied through amplifier 40 and across resistor 41 to node 42. Node 42 is supplied through buffer 43 to line 33 and across resistor 50 to line 32 which is coupled to the summing node 13 in the system of FIG. 1. Node 42 is connected to a one of N multiplexer 44 having N inputs. Each of the N inputs is coupled to a capacitor 45-1, 45-2, 45-3, 45-4, . . . 45-N. Multiplexer 44 is controlled by the signal on line 46 generated by counter 47. The counter 47 is clocked by the output of a phase locked loop 48. The input of the phase locked loop is a version of the predictable, periodic noise across line 49, which, in this case, is the AC power line (50 Hz or 60 Hz). Thus, in response to the clock signal generated at the output of the phase locked loop 48, the counter 47 controls the multiplexer to sequence through the capacitors 145-1 through 145-N for each period of the predictable noise. Effects of the switching noise generated by the multiplexing circuits can be reduced by placing amplifier 40 (typical gain of amplifier 40 is about 30) to provide gain in front of the multiplexer 44. These capacitors with the multiplexer form a synchronous detector which develops a stored version of the predictable, periodic noise and its harmonics reflected on node 42, from the error signal while all other components of the noise are rejected. The signal on line 42 can thus be used to compensate for such noise in the servo loop.

FIGS. 3-7 provide a detailed electrical schematic of one implementation of a servo loop, according to the present invention.

The part numbers and values of the various components of the circuit of FIGS. 3-7 are shown in the Figures. These values provide examples representative of a current design which is subject to modification for adaption to a particular system as known in the art. Unless noted otherwise, the capacitance values are in microFarads and the resistance values are in ohms.

Figure 3:
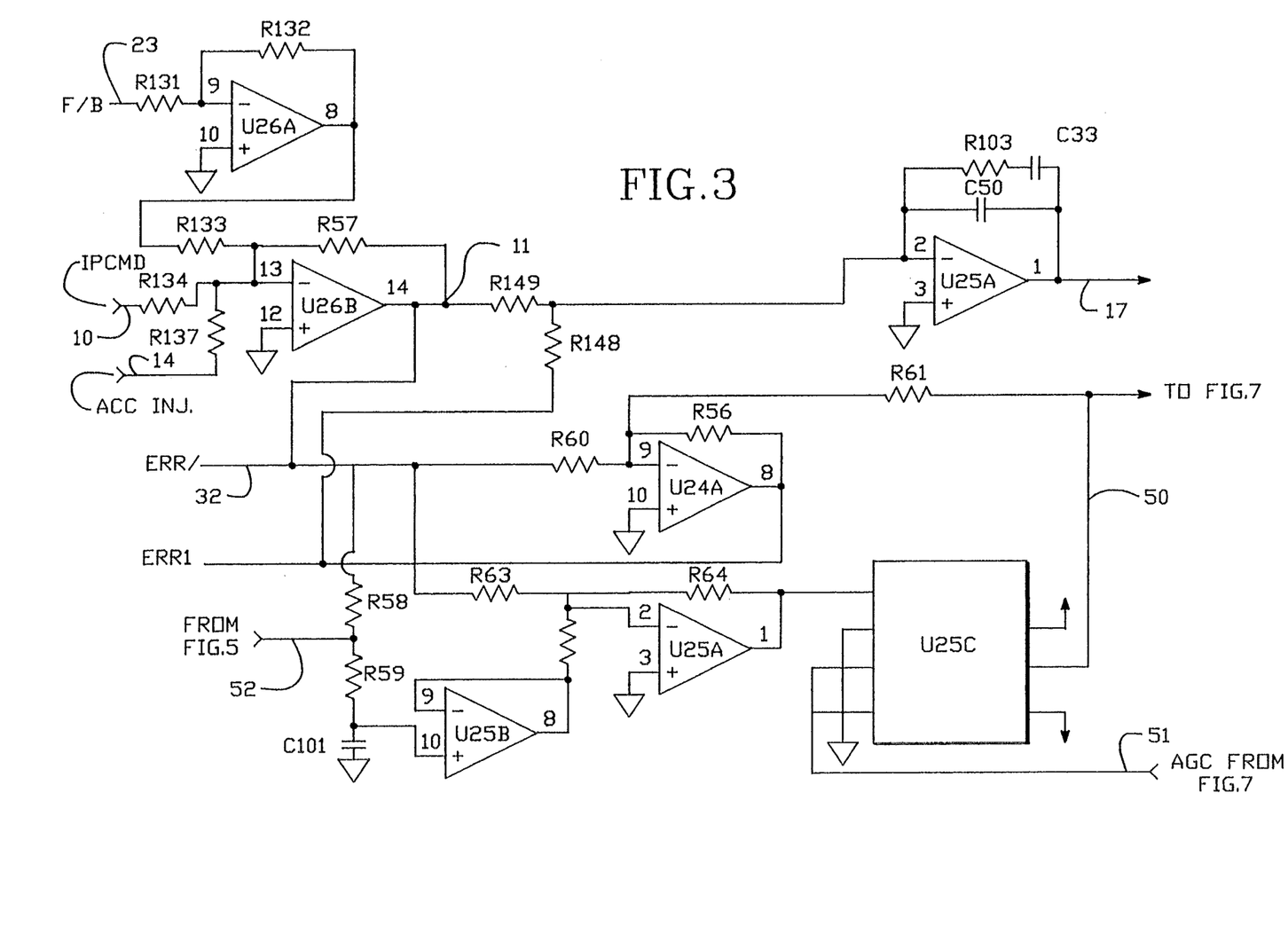
FIGS. 3, 4, 5, 6, and 7 together make up an electrical schematic diagram for the servo loop of FIG. 1.

In FIG. 3, the basic loop structure is illustrated. The inputs to the loop include the command IPCMD on line 10, the feedback signal FIB on line 23, and the injected signal AGC INJ on line 14 from the automatic gain controller.

Figure 7:
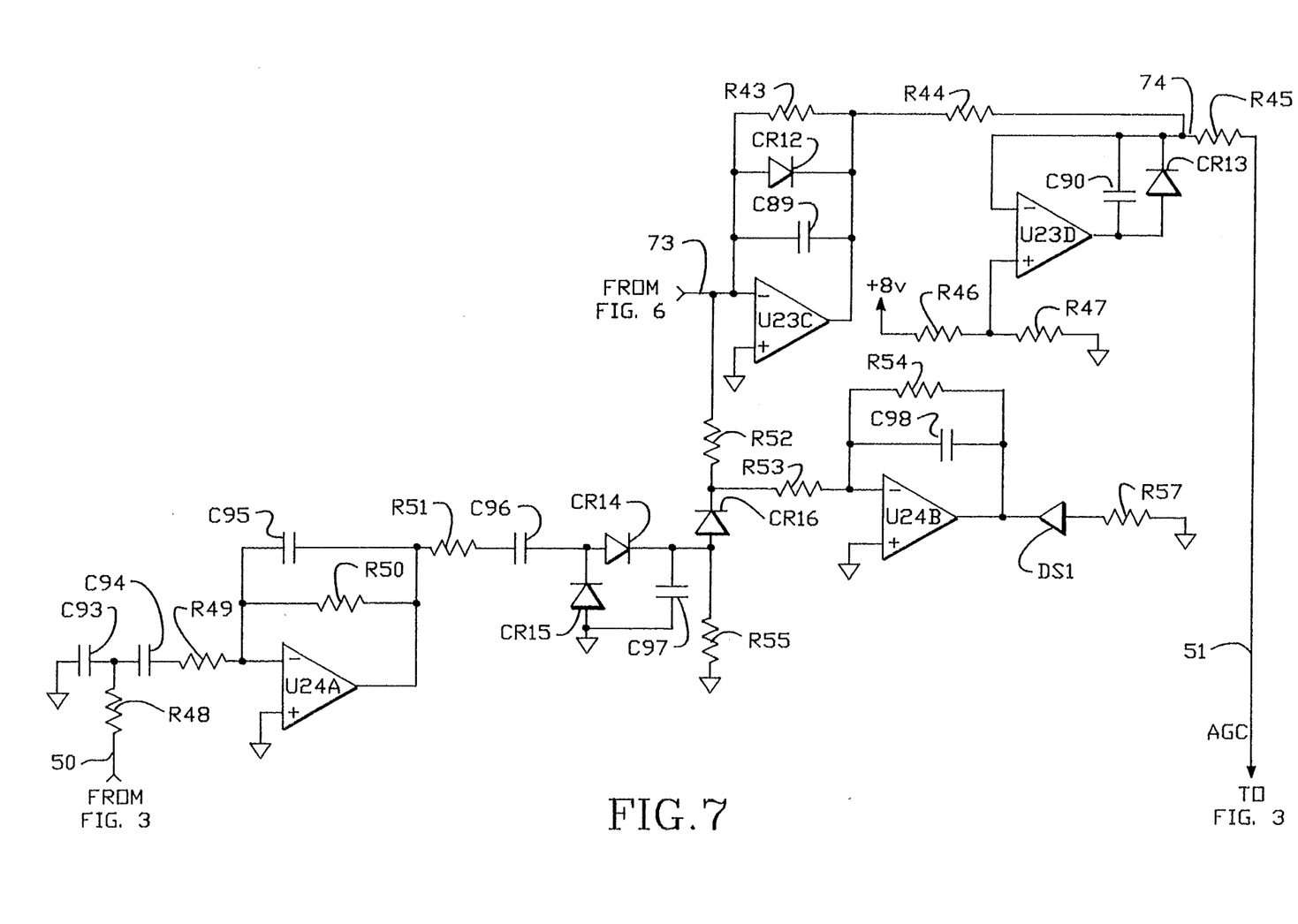

The feedback signal is supplied through resistor R131 as input to op-amp U26A. Op-amp U26A is a unity gain inverting amplifier having resistor R132 in feedback. The output of op-amp U26A is supplied through resistor R133 to the inverting input of op-amp U26B. The command signal on line 10 is supplied through resistor R134 to the inverting input of op-amp U26B. The injected signal from the automatic gain controller is supplied through resistor R147 to the inverting input of the op-amp U26B. Op-amp U26B has resistor R57 connected in feedback. The output of the op-amp U26B is the summed error signal for the load on line 11. The junction of resistors R149 and R148 make up the summing junction 13 for the loop. The signal on line 11 is supplied across resistor R60 to the inverting input of op-amp U24A. Op-amp U24A has resistor R56 in feedback, and supplies its output on line 32 through resistor R148 to the summing junction composed of resistors R149 and R148. The inverting input of op-amp U24A is also driven across resistor R61 by the output on line 50 of multiplier U26C. The multiplier U26C is a variable gain multiplier which is controlled by the signal AGC on line 51, which is supplied as illustrated in FIG. 7. The gain from node 52 and from node 11 to node 32 is controlled by the multiplier U26C, as set by the AGC signal from line 51.

The input to the multiplier U26C is the output of op-amp U25A, which includes a component based on the error signal on line 11 and a component based on the SYNCSIG at node 52 from the synchronous error regenerator. The magnitudes of these components are determined by the relative values of the resistors R62, R63, and R64.

Figure 4:
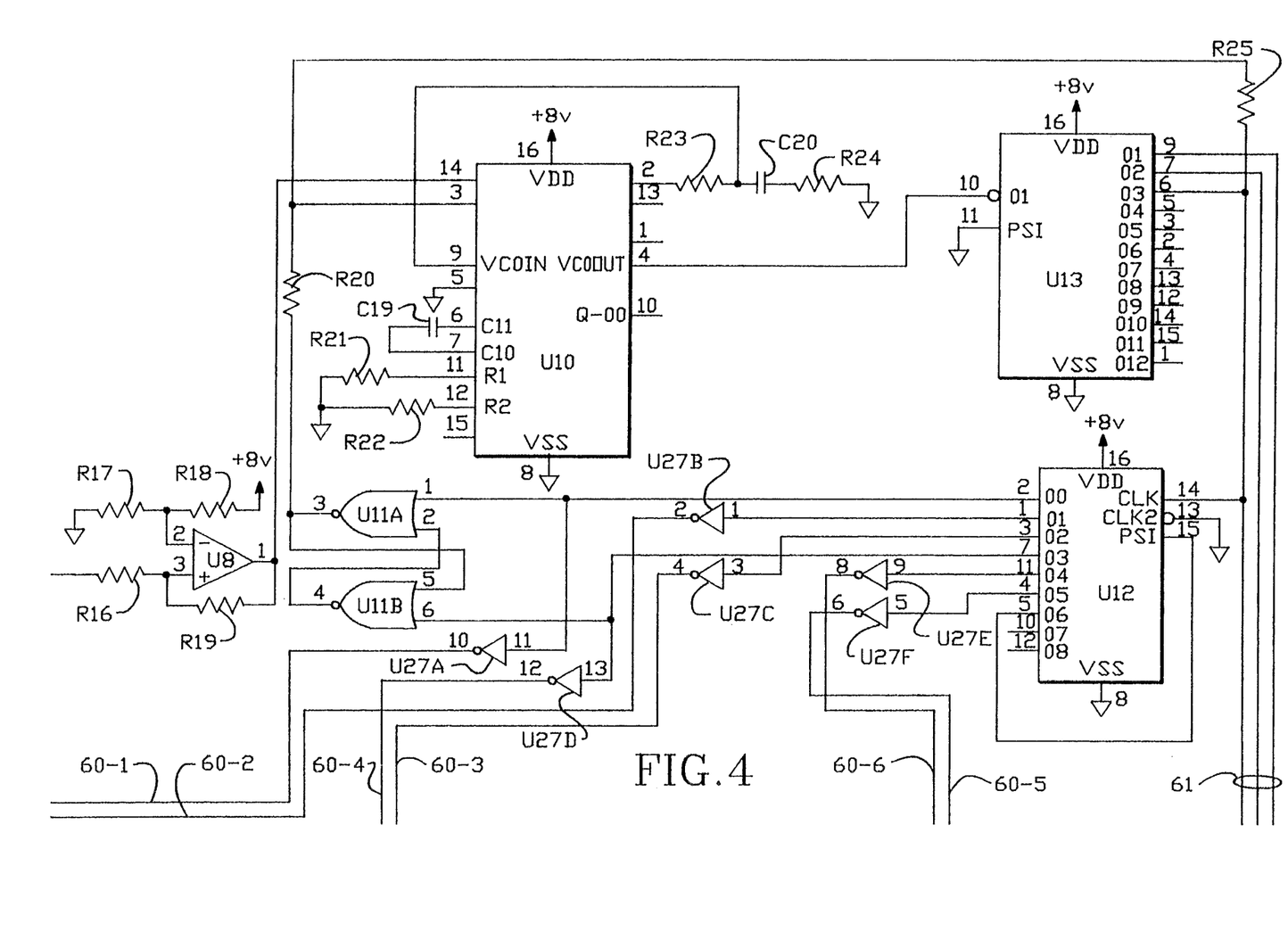
Figure 4A:
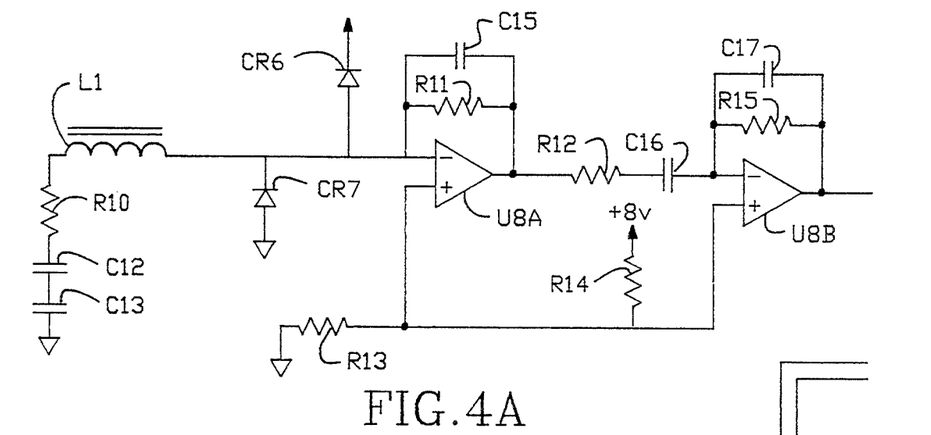
Figure 5:
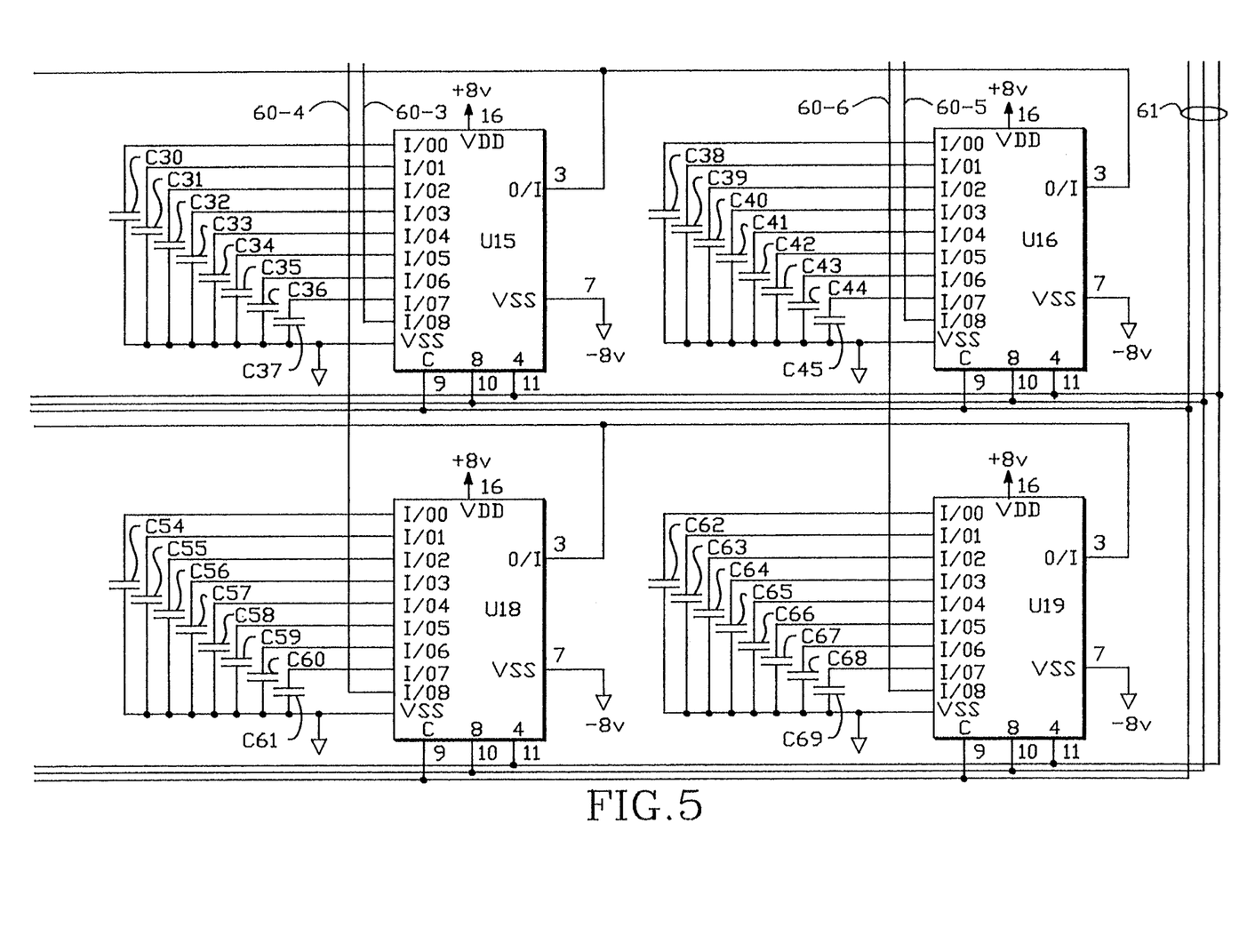
Figure 5A:
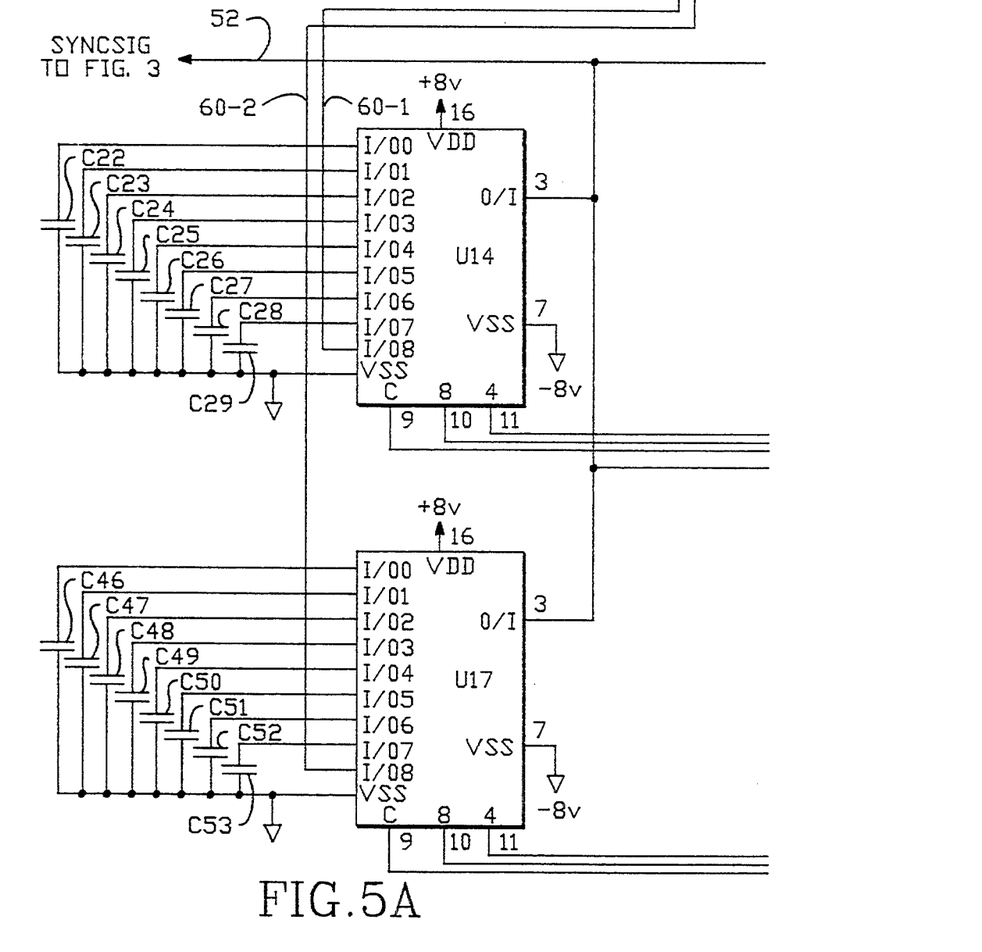

The error signal on line 11 is also supplied across resistor R63 to the inverting input of op-amp U25A. Op-amp U25A has resistor R64 in feedback. The inverting input of op-amp U25A is also driven by the signal supplied across resistor R62 from the output of op-amp U25B. The inverting input of op-amp U25B is connected in feedback to its output. The positive input of op-amp U25B is connected through an RC filter composed of capacitor C101 to ground and resistor R59 to a SYNCSIG node 52 which is developed as illustrated in FIGS. 4 and 5. Node 52 is connected across resistor R58 to line 11. R58 corresponds to resistor 41 of FIG. 2.

The output of the summing junction provided by resistors R149 and R148 is supplied at the inverting input of op-amp U29A. Op-amp U29A has capacitor C50 in parallel with resistor 103 and capacitor C33 in series, in feedback. This op-amp configuration provides the relatively broadband loop compensation network 16. The output of the op-amp U29A is supplied across line 17, as the signal which is supplied to control the power driver 18 for the system of FIG. 1.

In FIG. 4, the development of the SYNCH signal on line 28 of FIG. 1, the phase locked loop, and the counters are shown. The SYNCH signal is generated using an antennae network composed of capacitors C13 and C12, resistor R10, and inductor L1. This network serves as an antennae to pick up the 60 Hz line noise for generation of the SYNCH signal. Diodes CR6 and CR7 operate as a clamping network to prevent spikes from entering the system. The op-amp U8 with resistors R11 and C15 in feedback, is coupled across resistor R12 and capacitor C16 in series to the input of op-amp U8B.

Resistor R15 and capacitor C17 are connected in feedback for op-amp U8B. This provides two bandpass filters in series to isolate the 60 Hz signal. The output of op-amp U8B is connected across resistor R16 to the input of op-amp U9. Op-amp U9 is connected as a comparator to generate basically a square wave output at 60 Hz, having resistor R19 in feedback, with the trigger value set by resistors R17 and R18.

The 60 Hz signal is supplied at the output of op-amp U9 to the SIGIN input of the phase locked loop chip U10. This chip is configured according to design specifications set out by the manufacturer. The output of the phase locked loop is a 2880 Hz signal VCOOUT. The signal is supplied to the clock input of counter U13. The counter U13 is configured as a divide by 8 counter. Because the output of the phase locked loop is 2880 Hz as configured, counter U13 generates a signal at 360 Hz on pin Q3. The signal is connected to be fed back across resistor R25 to the COMP input of the phase locked loop. The value resistor R25 is very large in this embodiment, so that the effect of this feedback to the COMP signal is negligible. The control of the COMP signal is provided by the signal across resistor R20 as described below. By reversing the value of the resistors R25 and R20, the implementation described can be made to operate to sample either 60 Hz or 360 Hz noise. However, the embodiment described is a 60 Hz embodiment. (Line frequency in the U.S.A. is 60 Hz and in most other countries, 50 Hz. The circuit can be adapted to either frequency.)

The signal on output Q3 of control U13 is supplied to the clock input of Johnson counter U12. The outputs Q0–Q6 of the Johnson counter U12 are pulsed in sequence at the 360 Hz rate. Thus, the outputs Q0 and Q3 of the Johnson counter U12 drive the square wave generator composed of NOR gates U11A and U11B. The output of the NOR gates U11A and U11B is supplied across resistor R20 to the COMP input of the phase locked loop. This causes the phase locked loop to oscillate at 2880 Hz with a 60 Hz input.

The signals from the outputs Q0–Q6 of the Johnson counter U12 are coupled through inverters U27A to U27F, respectively, to lines 60-1 through 60-6, respectively, which are coupled to the circuit in FIG. 5 as described below.

The outputs Q1–Q3 on lines 61 of the counter U13 are also supplied to the circuit of FIG. 5.

The circuit of FIG. 5 shows the multiplexing circuitry and the capacitors used to develop the stored version of the 60 Hz line noise. The signals 60-1 through 60-6 are coupled to inhibit inputs of analog multiplexers U14, U17, U15, U18, U16, U19, respectively. Each of the multiplexers U14 through U19 is an 8:1 multiplexer having 8 capacitors connected to its inputs. Each of the capacitors has a first terminal coupled to a reference supply (ground in this case) and a second terminal coupled to one of the multiplexer inputs. Thus, capacitors C22–C29 are coupled to the inputs of multiplexer U14. Capacitors C30–C37 are coupled to the inputs of multiplexer U15. Capacitors C38–C45 are coupled to the inputs of multiplexer U16. Capacitors C46–C53 are coupled to the inputs of multiplexer U17. Capacitors C54–C61 are coupled to the inputs of multiplexer U18. Capacitors C62–C69 are coupled to the inputs of multiplexer U19.

The outputs Q1–Q3 of the counter U13 in FIG. 4 are supplied on lines 61. These lines are distributed to the A, B, and C select inputs on each of the multiplexers U14–U19, as illustrated.

In operation, during a first one-sixth of a 60 Hz cycle, multiplexer U14 is enabled. Thus, the SYNCSIG line 52 is coupled to capacitors C22–C29 in sequence at a rate of 2880 Hz, or 1 for each one-eighth of each one-sixth of a 60 Hz cycle. During the second one-sixth of the 60 Hz cycle, multiplexer U17 is enabled, and capacitors C45–C53 are switched onto node 52. During the third one-sixth, multiplexer U15 is operable to drive node 52. During the fourth one-sixth of the 60 Hz cycle, multiplexer U18 is enabled to drive node 52. During the fifth one-sixth of the 60 Hz cycle, multiplexer U16 is enabled to drive node 52. Finally, during the last one-sixth of the 60 Hz cycle, multiplexer U19 is connected to drive node 52. A larger or smaller number of capacitors could be used as suits a particular application.

Thus, capacitors C22–C59 develop a stored version of the predictable, periodic noise from the error signal, as reflected on node 52. The signal is reinjected into the loop, as described above, to compensate for such noise in the output of the entity to be controlled.

Figure 6:
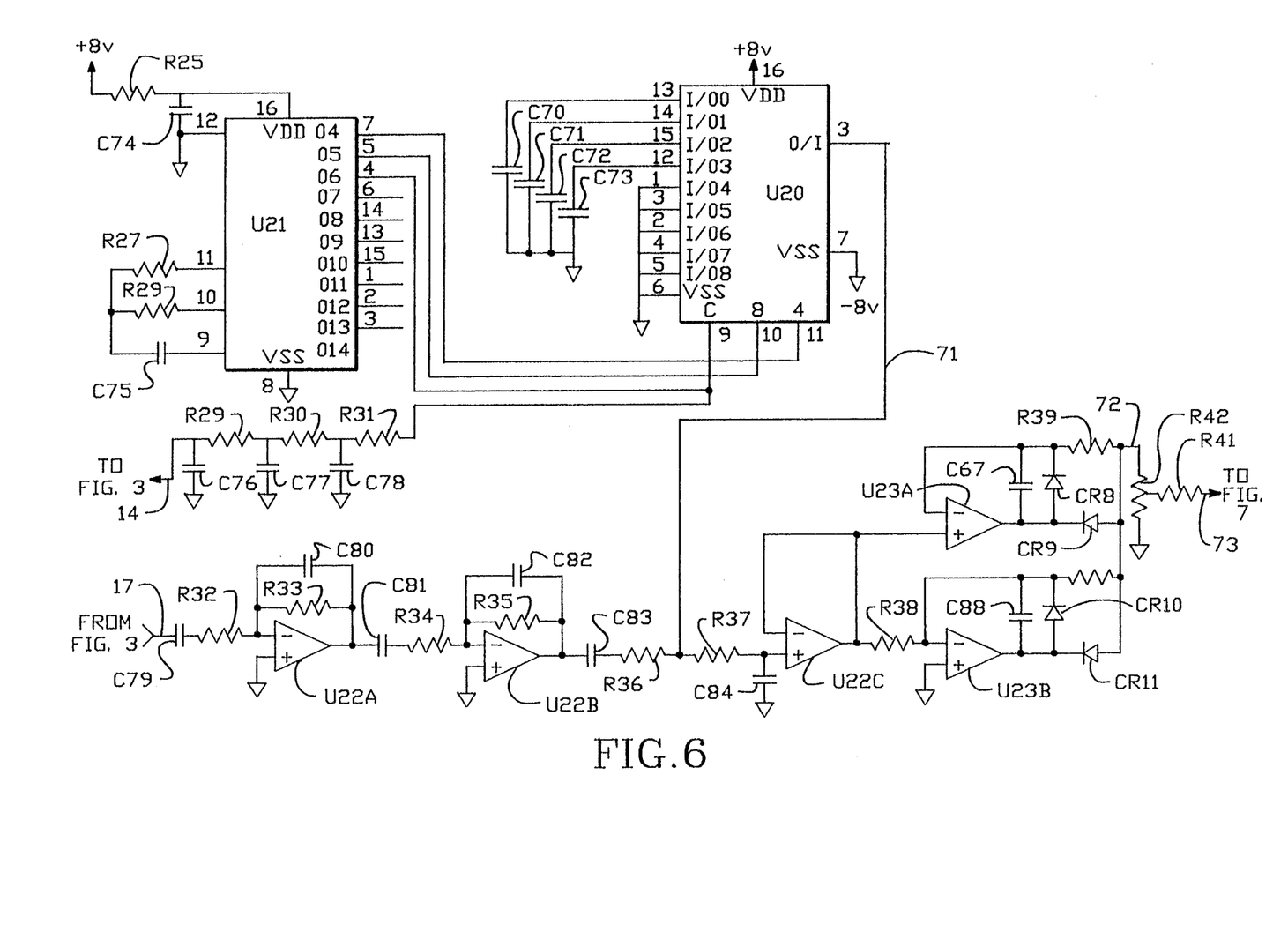

FIGS. 6 and 7 illustrate the automatic gain control circuitry for the system of FIG. 1. In FIG. 6, a circuit for injecting a small sample, into the feedback loop on line 14 consists of the oscillator U21 set up so that output Q6 oscillates at 12 Hz in the embodiment described. The Q6 output of the oscillator is supplied on line 70 through the low pass network consisting of resistors R29–R31 and capacitors C76–C78. The output of the low pass network is supplied on line 14 as the injected signal to the summing node through resistor R147, as shown in FIG. 3.

The oscillator U21 develops outputs on Q4–Q6 which are used to drive analog multiplexer U20. Analog multiplexer U20 has capacitors C70–C73 coupled to its first four inputs to develop a stored version of a halfcycle of the injected noise. This is a synchronous error regenerator used for detecting the amplitude of the injected noise in the loop, as described below.

The output of U29A of the loop compensation network 16 of FIG. 1 is generated as shown in FIG. 3, and is supplied on line 17 back to the automatic gain controller, as described above. Line 17 is supplied as an input to the filtering stages in the automatic gain controller made up by the sequence of op-amps U22A, U22B and U22C of FIG. 6. First op-amp U22A has resistor R33 and capacitor C80 in feedback. Its input is received through capacitor C79 and resistor R32. The output is supplied through capacitor C81 and resistor R34 to the second stage op-amp U22B, having resistor R35 and capacitor C82 in feedback. The output of the second op-amp U22B is supplied through capacitor C83 and resistor R36 to node 71. Node 71 is coupled to the output of the analog multiplexer U20 to develop a stored version of the resultant of the injected noise on line 17, FIG. 3. Node 71 is coupled through resistor R37 to buffer formed by op-amp U22C, with capacitor C84 connected between the input of op-amp U226 and ground. The output of the op-amp U22C is supplied to an absolute value generator composed of the parallel op-amps U23A and U23B. The input of op-amp 23A is directly coupled to the output of the buffer U22C. It has capacitor C87, diode CR8, and resistor R39 in feedback. The output of U23A is also coupled through reverse diode CR9 to node 72. The lower op-amp U23B receives the output of buffer U22C through resistor R38. It has a similar output network coupled to node 72, composed of capacitor C88, diodes CR10 and CR11, and resistor R40. The signal on line 72 is supplied across R42 to ground. R42 is tapped at an adjustable value, and connected across resistor R41 to line 73. The signal at line 73 is representative of the inverse of the magnitude of the injected noise; that is, the magnitude of the fluctuation in output power of the laser caused by the noise injected on line 14.

As shown in FIG. 7, the signal on line 73 is coupled through a smoothing filter formed by op-amp U23C having capacitor C89, diode CR12, and resistor R43 in feedback. The output of U23C is supplied across resistor R44 to node 74. Node 74 is driven by op-amp U23D connected as a "artificial Zener diode", which insures that node 74 never drops below a small value of approximately 0.7 volts in this embodiment. Op-amp U23D has its positive input driven by voltage divider formed by resistors R46 and R47. Its feedback network consists of capacitor C90 and diode CR13.

Node 74 is coupled across resistor R45 to AGC line 51 which controls the magnitude of the gain generated in multiplier U26C of FIG. 3, as described above.

FIG. 7 also includes a network used to dampen oscillation in the network. In this embodiment, a resonant frequency of about 3 KHz is found. The circuit serves to dampen oscillation at 3 KHz. The signal on line 50 is received from the output of the multiplier U26C of FIG. 3. It is supplied across resistor R48 to node 75. Node 75 is connected across capacitor C93 to ground and across capacitor C94 and resistor R49 to the inverting input of op-amp U24A. Op-amp U24A is a filter tuned to about 3 KHz with resistor R50 and capacitor C95 in feedback.

The output of the op-amp U24A is supplied through resistor R51 and capacitor C96 to a charge pump comprised of diodes CR14 and CR15 coupled across capacitor C97. The output of the charge pump is coupled across resistor R55 to ground and through diode CR16 and resistor R52 to the input of the controller op-amp U23C. Thus, if the loop starts to oscillate at 3 KHz, a signal developed in the charge pump will dampen the gain in the loop.

The op-amp U24B receives the signal from the charge pump across resistor R53, at junction of CR16 and R52. This op-amp U24B drives a light emitting diode DS1 which indicates oscillation in the network to a user of the system. Op-amp U24B has capacitor C98 and resistor R54 in feedback. The light emitting diode DS1 is coupled between the output of the op-amp and resistor R57, which is coupled to ground.

Figure 8:
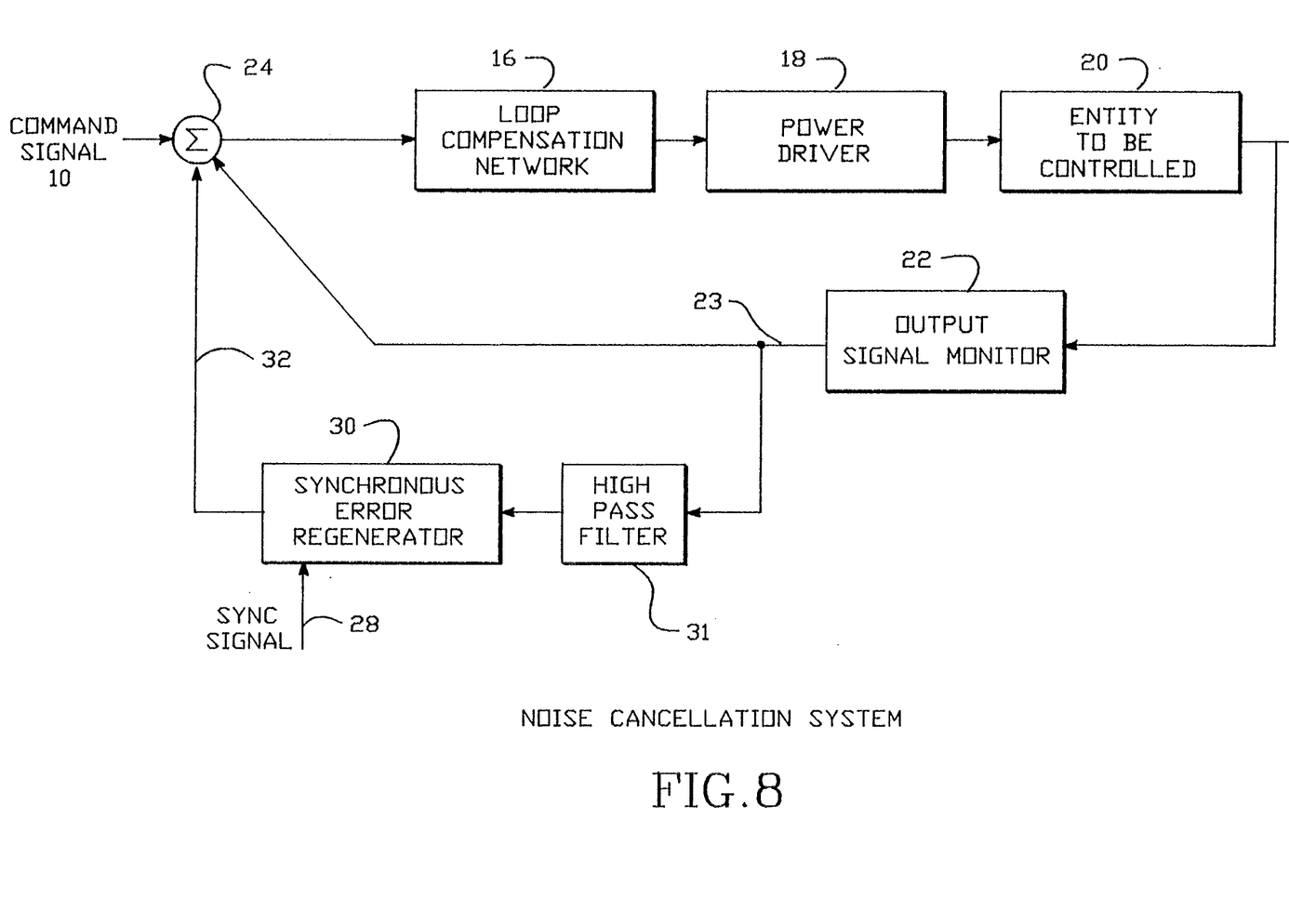
FIG. 8 illustrates an alternative configuration for a servo system according to the present invention.

FIG. 8 illustrates an alternative configuration of the loop according to the present invention. Thus, the automatic gain control element is removed. Also, the synchronous error regenerator 30 is placed in a different location in the loop. In particular, synchronous error regenerator 30 is coupled to the output of the high pass filter 31. The input to the high pass filter 31 is a signal on line 23 from the output signal monitor 22. The output of the synchronous error regenerator is coupled across line 32 to the summing junction 24.

The configuration of FIG. 8 is advantageous for retrofitting existing power supply systems with the synchronous error correction capability of the present invention. This configuration will allow use of a synchronous error regenerator circuit on an add-on board for existing systems.

The synchronous error regenerator, according to the present invention, can be understood either in the time domain or the frequency domain. In the time domain, the system chops the noise into N buckets (typically, N=48). In each bucket of time, an approximation of the error signal is stored on a capacitor. That error is injected in the loop to drive the error closer to zero.

In general, for this design, a longer RC time constant means it takes longer to measure the synchronous error, but it is done so more accurately (R=resistance of resistor 41, and C=capacitance of charge holding capacitor 45-N of FIG. 2)

In the frequency domain, the following observations can be made:
1) The circuit attenuates all frequencies which are not DC or harmonics of the 60 Hz line.
2) At DC, you have a low pass RC filter with an effective time constant of approximately N*RC, where N is the number of capacitors.
3) Increasing the RC time constant narrows the bandwidth.
4) The phase shift of the output signal with respect to the input is zero at the harmonics, but swings wildly on either side. (magnitude of swings depends on RC constant and harmonic number). The phase shift is zero because the voltage on any one capacitor is not changing very quickly and you see a resistive divider (zero phase shift) from input to output.

The gist of all this is a compensation block with some very unusual gain and phase characteristics. Pure gain (20 dB, say) in front of the synchronous detector, will add that much gain to the loop at line-related noise frequencies—without having so much phase shift and gain at higher frequencies that the loop goes unstable.

An alternative system may be implemented using digital signal processing.

An algorithm for implementing a digital signal processing embodiment is as follows:

```
#define NSAMPS 48 /* number of times per 60 Hz period we sample*/
while (1) {
    x=ReadADC;
    y[index]=y[index]+alpha*(x−y[index]);
    WriteDAC(y[index]);
    index=index−1;
    if(index<0 then index=NSAMPS−1;
    wait for sync signal;
}
```

This method is based on reading the output of an analog to digital converter (ADC), applying a digital filter, and converting the value to an analog signal in a digital to analog converter (DAC), in synchronism with the periodic noise.

The frequency response of this algorithm (Bode plot; magnitude and phase response versus frequency) can be described by the following equation:

$$\frac{Y(s)}{X(s)} = \frac{1 - \exp(-sT_z)}{sT_z} \cdot \frac{\alpha}{1 + (\alpha - 1)\exp(-sT)} \exp(-s\tau)$$

where:
$T_z$ = "zero order hold" time; in my case, $1/(60*48)$
$T$ = "algorithm sample time"; in my case, $1/60$
$\alpha$ = filter bandwidth constant
$\tau$ = computer processing delay (from ADC read to DAC write)

The first term models the analog to digital converter ADC, the second term models the algorithm, and the third accounts for computer delay. This algorithm has increasing phase shift with frequency, even if the computer delay is zero. To insure stability, one should use the algorithm for a short while, then "turn it off" and just use the computed y[index] values.

This digital algorithm may be modified to more closely model the analog implementation with a higher sampling rate as follows:

```
#define NSAMPS 48
#define NSUB_SAMPS 10
while (1) {
        x=ReadADC;
        y[index]=y[index]+alpha*(x−y[index]);
        WriteDAC(y);
        sub_sample_index=sub_sample_index−1;
        if(sub_sample_index<0){
                sub_sample_index=NSUB_SAMPS−1;
                index=index−1;
                if(index<0 then index=NSAMPS−1;
        }
        wait for sync signal;
}
```

This more closely models the analog implementation because the digital filter equivalent of an RC low pass filter is $Y_k = Y_k + \text{alpha}*(X_k - Y_{k-1})$, where:

$Y_k$ is the output at time index k, $X_k$ is the input at time index k, and alpha corresponds to the RC time constant.

Note that this method is an RC filter between "major time periods" based on the index over NSAMPS, while this is an RC filter which also operates on "minor time periods" based on the index over NSUB_SAMPS.

Measurements indicate a reasonable match between this and the analog implementation, but:

1) there is still a "droop" in phase due to processing delay. This method may be unstable unless used in the measure and remember mode mentioned above and shown in FIG. 9.

2) there is a phase offset of about 90 degrees.

Figure 9:
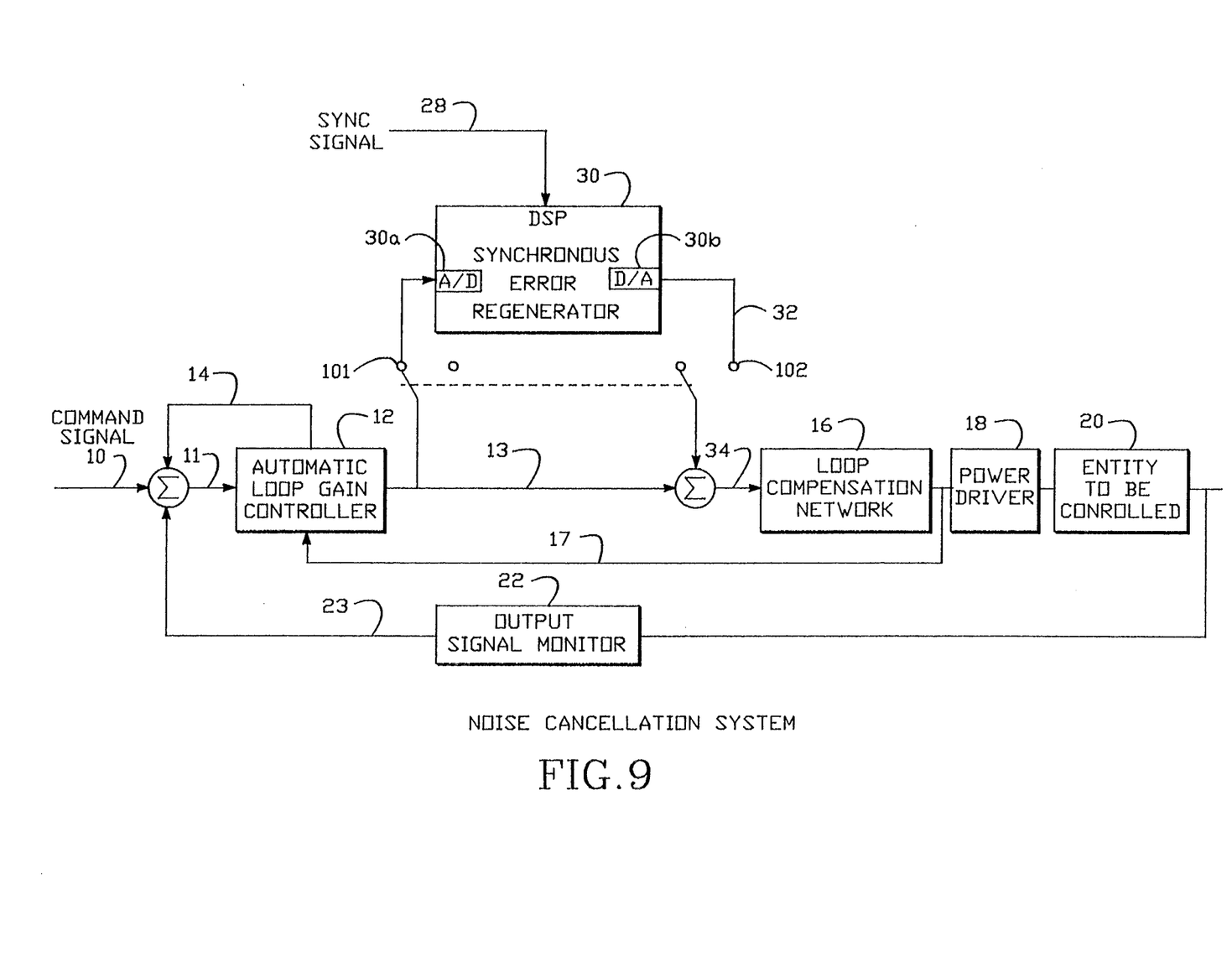
FIG. 9 is a block diagram of yet another alternative implementation of the present invention.

As shown in FIG. 9, the system may be modified to operate in a measure and remember mode. This implementation assumes that the error signal does not change for long periods of time. For line noise on lasers, that may be a reasonable assumption for only a few minutes. For a piece of rotating machinery at a well controlled frequency, it may be a good assumption for many minutes.

As shown in FIG. 9, the control loop is basically the same as shown in FIG. 1. However, a synchronous error regenerator 30 based is placed in a different location in the loop by way of example. Also, the synchronous error regenerator is based on digital signal processing, and includes switches 101 and 102 placed at the input to an analog to digital converter 30a on the input of the synchronous error regenerator 30, and the output of a digital to analog converter 30b on the output of the synchronous error regenerator 30, respectively. In the measure mode, a stored version of synchronous error is developed. In the remember mode, this stored version is used to control gain in the laser system. The system of FIG. 9 is implemented using a digital routine, with the advantage that the digital values do not discharge. The store and remember method can also be implemented with an analog version. However, the voltage on the capacitors gradually discharges with time.

One can combine several copies of the synchronous error regenerator tuned for other frequencies. Thus, one could target non-harmonically related repetitive noise frequencies with separate synchronous error regenerators in the same loop. One could use a first synchronous error regenerator to attack 60 Hz line noise, and another to attack noise from a rotating piece of machinery in the environment. One could also tailor the frequency response within limits.

As described above, the analog implementation provides excellent noise rejection for predictable, periodic noise, particularly as applied to laser systems. It is inexpensive to implement, not requiring digital signal processing and the like, which drives up the cost of the servo loops involved. Accordingly, the present invention provides an economical and highly effective technique for reducing predictable, periodic noise in a servo loop.

The foregoing description of preferred embodiments of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A controller for a laser system generating an output beam subject to predictable noise, comprising:

a power driver coupled to the laser system which supplies power to the laser system;

an output signal monitor, coupled with the laser system which generates a feedback signal indicating an output power for the laser system;

a servo circuit, coupled to the output signal monitor and the power driver, which controls the power driver to compensate for noise reflected in the feedback signal, the servo circuit including resources which develop a stored version of the predictable noise reflected in the feedback signal, and which use the stored version of the predictable noise to compensate for the predictable noise.

2. The controller of claim 1, wherein said resources include sampling circuitry which samples the predictable noise reflected in the feedback signal to generate the stored version.

3. The controller of claim 2, wherein the predictable noise is substantially periodic, and the sampling circuitry includes a circuit which generates a synch signal in time with the predictable noise, and the sampling circuitry samples the predictable noise in response to the synch signal.

4. The controller of claim 3, wherein the sampling circuitry includes a plurality of charge storage devices responsive to the synch signal to sample and hold the stored version.

5. The controller of claim 2, wherein the sampling circuitry converts the predictable noise to a digital form to develop the stored version.

6. A laser system controller for a laser responsive to input power, which generates an output beam subject to predictable periodic noise, comprising:

a power supply, responsive to a control signal and coupled to the laser which supplies the input power;

a power sensor in the path of the output beam which generates a feedback signal indicating output power for the laser; and a servo circuit which generates an error compensation component of the control signal in response to the feedback signal, coupled to the power supply and the power sensor, including
  a relatively broadband loop compensation network tending to cause the error compensation component to cancel relatively broadband noise,
  sampling resources which develop a stored representation of the predictable periodic noise in the feedback signal, and
  resources responsive to the stored representation tending to cause the error compensation component to cancel the predictable periodic noise.

7. The laser system controller of claim 6, wherein the relatively broad band compensation network includes resources which automatically adjust loop gain.

8. The laser system controller of claim 6, wherein the sampling resources include a sample and hold network.

9. The laser system controller of claim 6, wherein the sampling resources convert the predictable noise to a digital form to develop the stored version.

10. The laser system controller of claim 6, wherein the sampling resources include:
  a plurality of charge storage devices, each having a first terminal connected to a reference potential and a second terminal;
  multiplexing circuitry, having a plurality of inputs coupled to the second terminals of the plurality of charge storage devices, which connects a selected input to an output which is coupled to a sample node receiving the feedback signal;
  control circuits which control the multiplexing circuitry to switch the plurality of inputs to the output in synchronism with the predictable periodic noise so that the stored version is developed in the plurality of charge storage devices; and
  a loop summing junction coupled to the sample node which injects voltage developed at the sample node into the error compensation component.

11. The laser system controller of claim 10, wherein the laser system controller is coupled to a source of alternating current electrical power having substantially constant frequency, and the predicable periodic noise is a result of said source, and wherein the control circuits include timing circuitry which controls the multiplexing circuitry in response to the source of alternating current electrical power.

12. The laser system controller of claim 6, wherein the laser system controller is coupled to a source of alternating current electrical power having standard frequency, and the predicable periodic noise is a result of said source.

13. The laser system controller of claim 11, wherein the timing circuitry includes a phase locked loop generating a clock signal having a frequency which is an integer N times the substantially constant frequency, so that the plurality of charge storage devices includes at least N devices to store at least one period of the predictable periodic noise.

14. A laser system, comprising:
  a laser which generates an output beam in response to input power, the output beam subject to predictable periodic noise from a source a alternating current electrical power;
  a power supply, responsive to a control signal and coupled to the laser which supplies the input power;
  a power sensor in the path of the output beam which generates a feedback signal indicating output power for the output beam of the laser; and
  a servo circuit which generates an error compensation component of the control signal in response to the feedback signal, coupled to the power supply and the power sensor, including
    a relatively broadband loop compensation network tending to cause the error compensation component to cancel relatively broadband noise,
    sampling resources which develop a stored representation of the predictable periodic noise in the feedback signal, and
    resources responsive to the stored representation tending to cause the error compensation component to cancel the predictable periodic noise.

15. The laser system of claim 14, wherein the relatively broad band compensation network includes resources which automatically adjust loop gain as gain in the system varies.

16. The laser system of claim 14, wherein the sampling resources include a sample and hold network.

17. The laser system of claim 14 wherein the sampling resources convert the predictable noise to a digital form to develop the stored version.

18. The laser system of claim 14, wherein the sampling resources include:
  a plurality of charge storage devices, each having a first terminal connected to a reference potential and a second terminal;
  multiplexing circuitry, having a plurality of inputs coupled to the second terminals of the plurality of charge storage devices, which connects a selected input to an output which is coupled to a sample node receiving the feedback signal;
  control circuits which control the multiplexing circuitry to switch the plurality of inputs to the output in synchronism with the predictable periodic noise so that the stored version is developed in the plurality of charge storage devices; and
  a loop summing junction coupled to the sample node which injects voltage developed at the sample node into the error compensation component.

19. The laser system of claim 18, wherein the control circuits include timing circuitry which controls the multiplexing circuitry in response to the source of alternating current electrical power.

20. The laser system of claim 19, wherein the source of alternating current electrical power has a substantially constant frequency, and the timing circuitry includes a phase locked loop generating a clock signal having a frequency which is an integer N times the substantially constant frequency, so that the plurality of charge storage devices includes at least N devices to store at least one period of the predictable periodic noise.

21. The laser system of claim 14, wherein the laser comprises a laser tube having a cathode heated by current from the source of alternating current electrical power.

22. A laser system, comprising:
  an ion laser, having a cathode heated by a source of alternating current electrical power, which generates an output beam in response to input power and subject to noise from said source;
  a power supply, responsive to a control signal and coupled to the laser which supplies the input power;
  a power sensor in the path of the output beam which generates a feedback signal indicating output power for the laser; and a servo circuit which generates an error compensation component of the control signal in response to the feedback signal, coupled to the power supply and the power sensor, including
- a relatively broadband loop compensation network tending to cause the error compensation component to cancel relatively broadband noise,
- a plurality of charge storage devices, each having a first terminal connected to a reference potential and a second terminal,
- multiplexing circuitry, having a plurality of inputs coupled to the second terminals of the plurality of charge storage devices, which connects a selected input to an output which is coupled to a sample node receiving the feedback signal,
- control circuits which control the multiplexing circuitry to switch the plurality of inputs to the output in synchronism with the predictable periodic noise so that the stored version is developed in the plurality of charge storage devices, and
- a loop summing junction coupled to the sample node and the relatively broadband loop compensation network which injects voltage developed at the sample node into the error compensation component.

23. The laser system of claim 22, wherein the source of alternating current electrical power has a substantially constant frequency, and the timing circuitry includes a phase locked loop generating a clock signal having a frequency which is an integer N times the substantially constant frequency, so that the plurality of charge storage devices includes at least N devices to store at least one period of the predictable periodic noise.

24. The laser system of claim 22, wherein the relatively broad band compensation network includes resources which automatically adjust loop gain as gain in the system varies.

25. A retrofit component for a controller for a laser system generating an output subject to predictable, periodic noise, in which the controller includes a servo circuit, coupled to an output signal monitor generating a feedback signal and coupled to a power driver for the laser system, which controls the power driver to compensate for noise reflected in the feedback signal, the retrofit component comprising resources, adapted to be connected to the servo circuit which develop a stored version of the predictable noise reflected in the feedback signal, and which use the stored version of the predictable noise to compensate for the predictable noise.

26. The component of claim 25, wherein the sampling circuitry includes a circuit which generates a synch signal in time with the predictable noise, and the sampling circuitry samples the predictable noise in response to the synch signal.

27. The component of claim 26, wherein the sampling circuitry includes a plurality of charge storage devices responsive to the synch signal to sample and hold the stored version.

28. The component of claim 26, wherein the sampling circuitry converts the predictable noise to a digital form to develop the stored version.

* * * * *